Jan. 12, 1960 W. T. JORGENSEN 2,920,444
PULSE REACTION COMBUSTION ENGINE
Filed June 5, 1956 2 Sheets-Sheet 1

INVENTOR.
WALTER T. JORGENSEN
BY
Morton Amster
ATTORNEY

Jan. 12, 1960

W. T. JORGENSEN 2,920,444

PULSE REACTION COMBUSTION ENGINE

Filed June 5, 1956

INVENTOR.
WALTER T. JORGENSEN
BY
Morton Amster
ATTORNEY

_United States Patent Office_ 2,920,444
Patented Jan. 12, 1960

2,920,444

PULSE REACTION COMBUSTION ENGINE

Walter T. Jorgensen, Baldwin, N.Y.

Application June 5, 1956, Serial No. 589,471

16 Claims. (Cl. 60—35.6)

My invention relates to improvements in combustion engines, and relates in particular to a combustion engine operating in a two-stroke cycle to release thrust pulses of rapidly-expanding, burning gas at high velocity.

Pulse reaction engines have hitherto posed serious disadvantages, including high fuel consumption, short range and endurance, and necessity for a boost assist to develop high air speed before the engine can operate efficiently.

It is an object of the present invention to provide a pulse reaction combustion engine of the character described in which all of the engine functions are performed by reciprocation of a free-floating piston, so that mechanical linkages, bearings, rotating parts and the like are eliminated, the engine itself being small, compact, extremely light in weight, and having a very low specific fuel consumption. The engine also has a self-cooling feature which eliminates the need for external cooling mechanisms and aids in reducing the engine weight.

It is another object of the invention to provide an engine of the character described which can be used singly as a power unit, or preferably in multiple series of units for a large variety of applications which will be evident to those versed in the art. Such applications include use on guided missles, as a prime power source on conventional aircraft, as a boost power assist for overloaded aircraft, as a power source for wingless aircraft, as an air compressor for driving military aircraft aviation components, as a drive for rotary turbine power convertors, as a drive for helicopter rotor blades, as an underwater unit for driving boats, as a drive for automotive vehicles, etc.

In general the engine comprises a closed housing in which a piston is mounted for free reciprocation. The piston in reciprocating draws air into the engine housing, compresses the air through a series of chambers, and delivers the air to a combustion chamber where it mixes with fuel which is also fed by operation of the piston. Downward movement of the piston then compresses the fuel mixture in the combustion chamber where the compressed mixture ignites and explodes, sending the piston upwardly to complete the cycle, and releasing a pulse of rapidly-expanding, still-burning gases at high velocity from the tail cone.

Numerous additional objects and advantages of the invention will become apparent in the course of the following specification when taken in connection with the accompanying drawings, in which.

Figure 1:
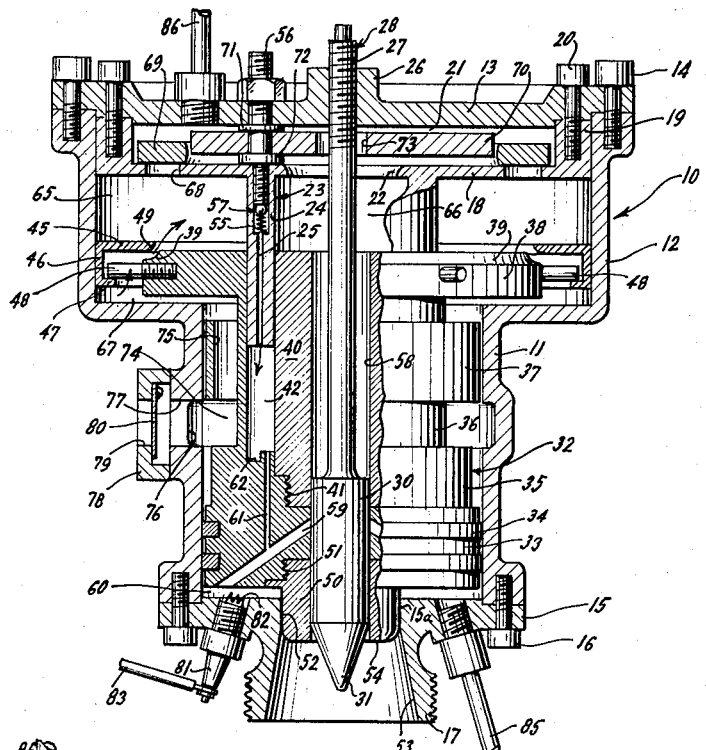
Fig. 1 is a central vertical section through the combustion engine of the invention, showing the free-floating piston at the bottom of its downstroke.

The engine generally comprises a closed housing 10 and a stepped, free-floating piston 32 which reciprocates vertically in said housing to provide a two-stroke cycle. During the downward stroke, the fuel-air mixture is compressed and burned, and on the upward stroke the burning gases are released in a high velocity pulse through a tail cone. Various air chambers and valves associated with the piston control the feeding of the fuel to the combustion chamber, and drive the piston on its down-stroke, as will be presently explained in detail.

The housing 10 comprises a lower cylinder portion 11 in which the piston travels and an integral upper portion 12 of enlarged diameter in which is generated compressed air power for driving the piston on its down-stroke.

The top end of the upper housing portion 12 is closed off by a cover plate 13, which is fixed in position on the housing by a plurality of bolts 14. The bottom open end of the lower cylinder portion 11 of housing 10 is closed off by a plate 15 fixedly mounted by bolts 16. The bottom plate 15 has a central discharge opening 15a bordered by a depending, integral tail cone or nozzle 17 through which the power pulses of burning gases are emitted.

Also fixed within the cylindrical upper housing portion 12 is a partition panel 18 of circular shape, which fits closely within the inner surface of the wall of housing portion 12. The partition panel 18 has an upstanding peripheral flange 19 which is claimped rigidly against the under surface of cover plate 13 by a plurality of bolts 20. The partition panel 18 is parallel to and spaced beneath the cover plate 13, this spacing forming an air chamber 21 of constant size, which chamber 21 constitutes an "air spring" area whose function will presently be explained.

Figure 4:
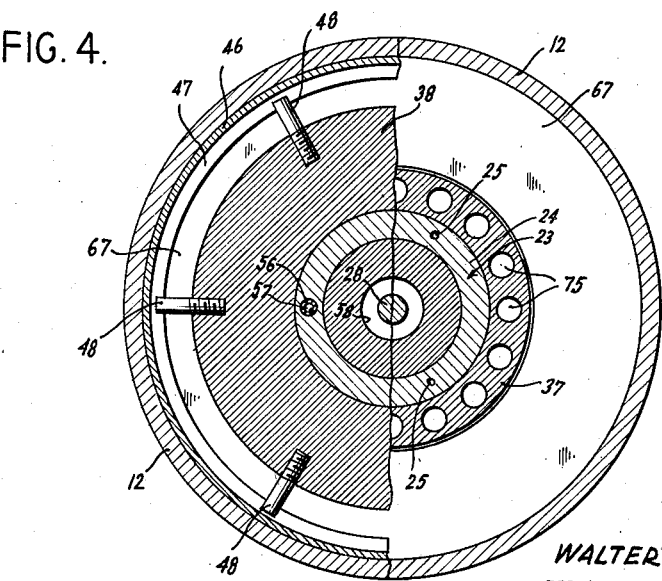
Fig. 4 is a section taken substantially along line 4—4 of Fig. 3.

The partition panel 18 has a large central circular opening 22 communicating with a cylindrical member 23 integral with the bottom surface of said partition panel and depending therefrom. The cylindrical wall 24 of member 23 has drilled therein a plurality of fuel passages 25 through which the liquid fuel is fed. Three such fuel passages 25 are shown in Fig. 4 by way of illustration, the number actually used being dictated by the size of the engine and the desired performance.

The cover plate 13 has a central, internally-threaded bushing 26 in which is mounted the threaded upper end 27 of a center post 28. The center post 28 depends from the cover plate 13 and extends through the opening 22 in the partition panel 18 and through the cylindrical member 23 into the center of the housing cylinder portion 11. The center post 28 is thus immovable during operation of the engine, except that it is adjustable vertically by means of its threaded upper end 27 to regulate the timing of the air discharge into the combustion chamber. Center post 28 has an integral bottom terminal extension 30 of enlarged diameter, the bottom end of which may be pointed as at 31.

The stepped, free-floating piston 32 is wholly contained within the housing 10 and comprises a lower section 33 which is the piston proper. This piston section 33 is lined by piston rings 34 which act in the usual manner to make a close fit with the inner surface of housing cylinder portion 11 and provide an air seal about said piston section 33. Immediately above the piston section 33 are two stepped sections 35 and 36 of progressively smaller diameter, and above the section 36 a fourth section 37 of a diameter to make a sliding fit within the wall of housing cylinder section 11.

The top of piston 32 terminates in an integral disc 38 of greater diameter than any of the other piston sections, and is always contained within the upper housing portion 12 during the operation of the engine. The disc 38 has a bevelled upper peripheral edge 39.

A ring 45 is carried by the disc 38 as a circumferential extension thereof. The ring 45 has a depending circumferential flange 46 which slides along the inner wall surface of the housing top portion 12, the flange 46 terminating in an inwardly-extending bottom flange 47. The ring 45 is coupled to the disc 38 by a plurality of pins 48 extending radially from said disc, said pins extending into the channel formed by the depending flange 46 and the bottom flange 47.

Figure 2:
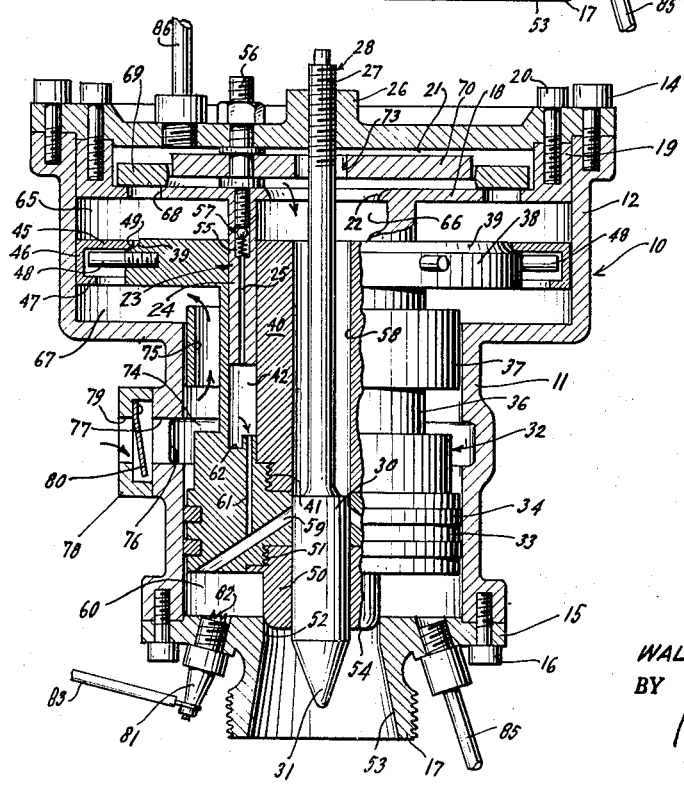
Fig. 2 is a central vertical section similar to Fig. 1, but showing the piston at an intermediate point in its upstroke.
Figure 3:
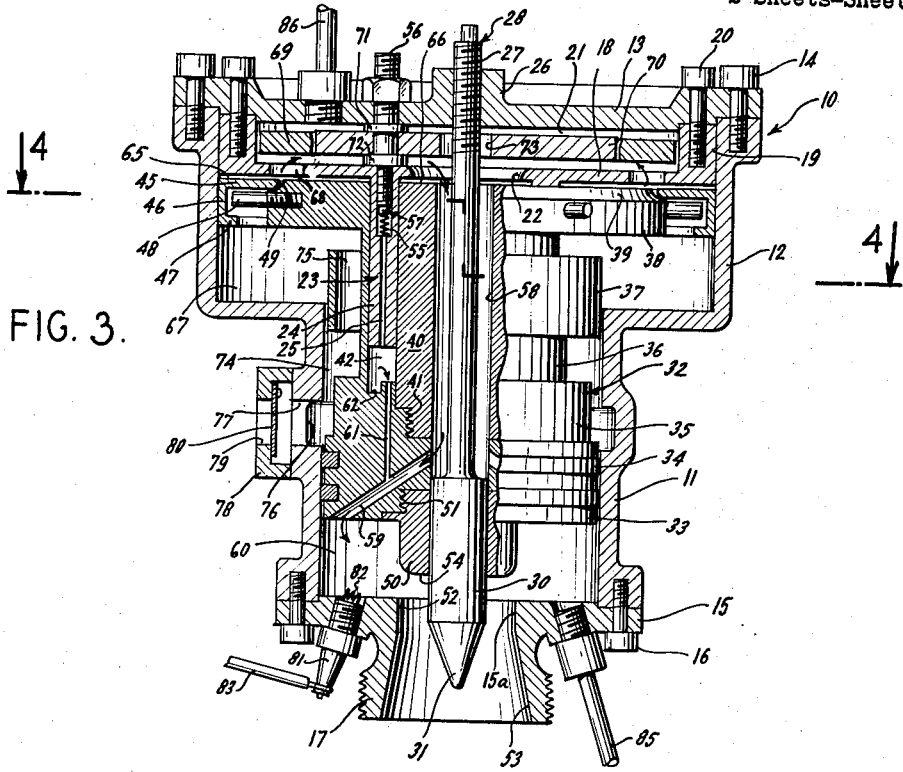
Fig. 3 is a central vertical section similar to Fig. 1, but showing the piston at the top of its upstroke.

The ring 45 acts as a floating valve to allow air to pass from the chamber beneath the disc 38 to the chamber above said disc on the down-stroke of the piston, but to prevent air from flowing in the reverse direction on the up-stroke of the piston. For this purpose, the ring has a bevelled inner peripheral edge 49 which fits within the bevelled edge 39 of the disc 38 on the up-stroke of the piston, as shown in Figs. 2 and 3, thereby forming a seal between the disc 38 and the wall of housing portion 12. On the up-stroke of the piston, the ring 45 is carried upward with the disc 38, the point of connection being at these bevelled edges. On the down-stroke of the piston, the pins 48 engage the bottom flange 47 of ring 45 and carry the ring down with the piston. As shown in Fig. 1, the bevelled edge 49 of the ring 45 is spaced from the bevelled edge 39 of the disc 38, providing an air passage around the edge of said disc, the air flowing in the direction of the arrows in Fig. 1.

The piston has a central bore extending downwardly from the top of the disc 38. Within this bore is a core 40 which is preferably formed separately and rigidly secured to the piston by screw threading 41. The core 40 is of lesser diameter than the central bore and forms therewith an annular fuel conversion chamber 42 which receives the wall 24 of the depending partition plate cylinder 23. The cylinder wall 24 is slidable in the fuel conversion chamber 42 during reciprocating movement of the piston, to increase and decrease the effective volume of said chamber. At such time, the chamber serves to convert the liquid fuel fed through fuel passages 25 to a gaseous fuel vapor and to feed this fuel vapor to the combustion chamber, in a manner which will be presently described.

The bottom of the piston 32 carries a depending pulse release member 50 which, for convenience of manufacture, may be separately formed and rigidly secured to the piston by screw threading 51. The tail cone 17 has throat 52 of constant diameter which communicates with an outwardly-flared lower extension opening 53. The pulse release member 50 has a lower portion 54 of annular shape, the outer diameter of which is equal to the diameter of the tail cone throat 52. On the piston down-stroke, the annular pulse release portion 54 fits snugly within the tail cone throat 52, as shown in Fig. 1, forming an air seal therewith and closing off the compression chamber. At the top of the piston up-stroke, the pulse release member 50 leaves the tail cone throat 52, releasing the combustion gases through the tail cone to produce the power pulse of the engine, as shown in Fig. 3.

The fuel passages 25 in the wall of cylinder 23 each communicate at their upper ends with a bore 55 of larger diameter which extends to the top surface of partition plate 18. A fuel inlet pipe 56 is screwed into each of the bores 55, each pipe 56 extending upwardly through the cover plate 13 and being in communication with a reservoir for liquid fuel (not shown). The bottom open end of each pipe 56 is normally closed by a spring loaded ball valve assembly 57 arranged to permit liquid fuel to pass out of pipe 56 into the bore 55, but to prevent fuel from passing back into the pipe 56. The fuel tank (not shown) is lightly pressurized to assure positive fuel flow to the fuel pipe 56.

A continuous longitudinal bore 58 of uniform diameter extends entirely through the center of piston 32. The bore 58 has an upper portion extending through the center core 40, an intermediate section extending through the center of piston 32 and a bottom section extending through the center of the pulse release member 54. Since the core 40 and the pulse release member 54 are permanently affixed to the body of the piston 32 and act as integral parts thereof, the aforementioned bore sections will be regarded as one continuous bore 58.

A plurality of passages 59 extend from the central bore 58 above the pulse release member 54, diagonally downward through the piston body, and open at the outer lower surface of the piston into the combustion chamber 60 which is formed between the bottom wall of the piston and the top wall of bottom plate 15. A fuel-vapor passage 61 of smaller diameter connects the center of each passage 59 with the annular chamber 42. The bottom of the annular chamber 42 is formed with a recess or groove 62 forming a circular well which extends below the level of the top of each fuel-vapor passage 61.

It will be observed that when the piston travels on its downstroke, the size of the annular chamber 42 becomes larger, creating a vacuum therein. This vacuum draws a few drops of liquid fuel through the fuel inlet pipe 56, past the ball valve 57, through the fuel passages 25 and into the well 62 at the bottom of said annular chamber. This liquid fuel will quickly vaporize due to the internal heat of the engine. On the upstroke of the piston, the annular chamber 42 is reduced in volume and the fuel-vapor is compressed, forcing the vaporized fuel through the fuel-vapor passage 61 and the passages 59 into the combustion chamber 60.

To obtain the correct mixture ratio in relation to the speed of the engine, a conventional needle valve may be contained in the fuel pipe 56 leading to the fuel reservoir. This needle valve (not shown) may be mechanically coupled to the adjustable center post 28 for simultaneous adjustment with the latter when timing of the engine is regulated thereby.

Reference will now be made to a series of internal chambers constituting a multiple air transfer system which operates by differential air pressure to drive the piston on its downstroke and also to compress air to high pressure, mix this compressed air with the fuel vapor, and deliver the high pressure fuel-air mixture to the combustion chamber.

The multiple air transfer system includes an annular low pressure air chamber 65 located above the top surfaces of disc 38 and its extension ring 45, a high pressure air chamber 66 located in the cylinder 23 above the piston core 40, and an annular very low pressure air chamber 67 located below the disc 38 and ring 45.

The low pressure air chamber 65 communicates with the air spring area 21 through a series of openings 68 in the partition plate 18. These openings 68 are normally closed by a ring valve 69 which is seated on the top of the partition plate. The ring valve is held from the lateral displacement by a circular guide plate 70 which is held spaced between the cover plate 13 and the partition plate 18 by a pair of spacer members 71 and 72 carried by each fuel inlet pipe 56. The guide plate 70 has a central opening 73 through which the center post 28 extends. The high pressure air chamber 66 communicates with the air spring area 21 through the central partition panel opening 22 and also communicates at its bottom end with the central piston bore 58.

The very low pressure air chamber 67 communicates with an air chamber 74 through a plurality of through bores 75 formed in the piston section 37. The air chamber 74 is located between the portion of the piston wall of lesser diameter than the housing, and an annular groove 76 formed in the inner wall surface of the housing cylinder portion 11. The housing wall contains a plurality of apertures 77 registering with the annular groove 76, each of said apertures being covered by a hollow outer housing extension 78, which contains an air inlet opening 79 covered by a reed valve or flap valve 80.

One or more glow plugs 81 of conventionl construction are mounted in the bottom plate 15, extending there-through with its coil 82 in communication with the combustion chamber 60. The glow plugs are connected by lead wires 83 to a source of electrical current, and operate in the usual manner so that their coils 82 are continually glowing during operation of the engine, the coils igniting the fuel mixture at a point of compression in the combustion chamber, depending on the type and volatility of the fuel-air mixture used.

*Operation*

The cycle of the engine consists of the following functions: starting, fuel injection and ignition, air movement through the various chambers, combustion, pulse release, and finally piston return and high pressure air lockout. All of these functions occur during a single downstroke and upstroke of the piston which constitutes a complete cycle of the engine.

Fig. 1 shows the piston 32 at the bottom of its downstroke. In this position, the combustion chamber 60 is at its minimum volume, and the fuel-air mixture therein is highly compressed and is in the process of being ignited by the coil 82 of glow plug 81. It will be observed that the pulse release member 50 is obstructing the throat 52 of the tail cone 17, and the center post bottom terminal extension 30 is blocking off the upper ends of passages 59, so that the combustion chamber 60 is effectively sealed. When the fuel-air mixture in the combustion chamber is ignited by the glow plug coil or coils 82, an explosion or rapid burning of the gases occurs which forces the piston upwardly.

Fig. 2 shows the piston 32 as it reaches appoximately the half-way point on its upstroke. The burning gases in the combustion chamber 60 are still expanding and forcing the piston upwardly, and the pulse release 50 is about to leave the tail cone throat 52. On this upstroke of the piston, the piston top disc 38 is carrying with it the extension ring 45 whose bevelled edge 49 is in firm engagement with the bevelled peripheral edge 39 of the disc, forming an air tight seal about said disc. It will thus be appreciated that as disc 38 and its extension ring 45 are raised, the volume of the very low pressure chamber 67 beneath said members is increased, forming a sub-atmospheric pressure therein. At the same time, the volume of the annular low pressure chamber 65 above said members is diminished, compressing the air in said chamber.

Because of the sub-atmospheric pressure created in the very low pressure air chamber 67, air is drawn therein through the piston bores 75, the air chamber 74, the piston air inlet apertures 77, and the air inlet openings 79, the flap valves 80 opening to admit air through said inlet openings 79. This air drawn into the low pressure air chamber 67 constitutes a charge of air which will be transferred to the chamber 65 on the downstroke of the piston, and will eventually be mixed with the fuel vapor and fed into the combustion chamber 60 as the piston continues to reciprocate.

As the piston rises and compresses the air within the low pressure chamber 65, it also raises the pressure within the high pressure cylinder chamber 66. Hence the pressure differential between the low pressure chamber 65 and high pressure chamber 66 is not great enough to lift the ring valve 69, because of the high pressure within the air spring area 21.

As the piston continues to rise, the pulse release 50 leaves the throat 52 of tail cone 17, and releases the burning fuel-air mixture from the combustion chamber 60, the burning and expanding gases blasting through the tail cone externally of the engine with considerable force and velocity to produce the power thrust pulse of the engine. Shortly thereafter, the piston rises further until the upper ends of passages 59 are brought above the center post extension 30 and into communication with the core central bore 58. Since there has been a large pressure drop in the combustion chamber 60 when the latter was opened, the compressed air in the high pressure chamber 66, the center bore 58 and the air spring area 21 is bled off through the passage 59 into the combustion chamber 60. Since the pressure in the high pressure chamber 66 is now less than that of the pressure chamber 65, the compressed air in the latter chamber lifts the ring valve 69 and passes through the partition plate openings 68 into the air spring area 21, thence through the central opening 22 into the high pressure chamber 66. Since the latter chamber also decreases in volume as the piston core 40 rises, this air charge is forced through the central bore 58 and the passage 59 into the combustion chamber 60.

At this time, the fuel which has fed into the well 62 has become vaporized, and as the piston rises, the annular fuel conversion chamber has decreased in volume, forcing this fuel vapor into the combustion chamber as shown by the arrows in Fig. 3 which shows the piston at the top of its upstroke.

When the piston reaches the top of its upstroke, as shown in Fig. 3, the combustion gases have been fully released from the combustion chamber 60, and the piston is now unbalanced since the pressure on its top side is now greater than the pressure existing on its bottom side. This is due primarily to the very rapid release of pressure through the tail cone at the bottom of the piston and the very high residual pressure that remains at the top of the piston in the pressure chamber 65 and the high pressure chamber 66. While it is true that a certain amount of compressed air has been bled off through the passages 59, the residual high pressure above the cylinder is sufficient to move the piston on its downstroke. This pressure may be regulated by adjustment of the center post 28 which determines the length of time during the upstroke at which the passages 59 are opened.

As the piston starts its downward movement, the ring 45 lags behind because of the friction of the housing wall, until the disc pins 48 engage the bottom flange 47 of the ring and carry the ring downwardly with the piston. At this time, the ring bevelled edge 49 is spaced from the disc bevelled edge 39, providing an air passage through which the pressures in the chamber 65 and the chamber 67 are equalized. The pressure in the high pressure chamber 66 is now greater than that in the low pressure chamber 65 so that the ring valve 69 is now snapped shut over the openings 68 by spring action of the air spring area 21. The upper ends of the passages 59 are also blocked off by the center post bottom extension 30. It will be observed that the high pressure in the air spring area 21 and its communicating high pressure chamber 66 is now effectively sealed off, and this high pressure continues to drive the piston downwardly to the bottom of its downstroke, shown in Fig. 1, thus completing the engine cycle.

It will be observed that the only energy taken from the burning fuel-air mixture is that energy required to move the piston on its upstroke. This energy requirement is very small, and the continued expansion of the gases outside the combustion chamber causes a pulse thrust similar to the reaction which would be achieved if live steam were released through an appropriate cone, except at a much larger magnitude, thereby creating a tremendous reaction force. This action occurs many times a second, so that the pulse thrusts released are almost equivalent to a continuous blast from the engine tail cone.

The engine is readily adapted for self starting with the aid of compressed air supplied by a storage source. This is accomplished by pipes 85 and 86 which open respectively into the combustion chamber 60 and the air spring area 21, and are fed by a common source of compressed air (not shown). Admission of compressed air from the two pipes 85 and 86 to the lower and upper surfaces of piston 32 will cause the piston to flutter since the upper and lower surfaces have different cross-sectional areas. As soon as the pulse release 50 leaves the tail cone throat 52, as shown in Fig. 3, the pressure will drop at the lower end of the piston, and the piston will be forced upwardly. This induced reciprocation of the piston continues until the engine starts to function under its own power, the fuel-air mixture igniting in the combustion chamber. In this regard, it is contemplated to provide a common accumulator between a series of engine units. In case of a misfire in any one unit at any time during operation, the system would take over and cause the unit to flutter until normal operation of the unit were again achieved.

An important advantage of the engine disclosed herein is the self-cooling feature of the piston and cylinder assembly. It will be noted that the air inlet openings 79 are located approximately ⅔ of the way down from the top of the housing 10. As the engine "breathes" in a fresh charge of outside air at each upstroke, this air travels within the wall of the piston 32, thereby cooling the piston and the housing wall. The necessity of a separate cooling apparatus is thereby eliminated. Also a large part of the heat energy is released to act outside the combustion chamber proper.

The engine unit can be made of extremely small size and light weight. Each unit may be made to fit within a space approximately eight inches in diameter and eight inches in length, the unit weighing roughly seven to nine pounds. Consequently, a battery of units can be compounded to propel a vehicle, without adding appreciably to the weight of the vehicle. In such an instance, the units could be connected to a common high-pressure manifold or accumulator system which would act to maintain operation of any defective unit, and also to maintain average high pressures in all high pressure chambers. This would have the effect of insuring that all units operate at the same speed and power output. An afterburner system could also be attached to each tail cone assembly to utilize the maximum thrust capabilities of the combined mass.

The engine unit is also adaptable to very high altitude operation. In conventional internal combustion engines, it is customary to lean out the fuel for high altitude operation where oxygen content and pressure of ambient atmosphere is low. In the engine of the instant invention, the fuel is not leaned out, but rather oxygen is added to the fuel-air mixture. This could be accomplished by connecting an automatic feeding source of oxygen to various parts of the engine. High pressure oxygen could be fed to the high pressure chamber 66 or low pressure oxygen could be fed to the low pressure chamber 65.

Since the engine develops thrust by the expansion and expulsion of high velocity gases through the pulse release system, it is evident that the unit is readily adaptable for driving rotary gas turbines. This is accomplished by attaching a turbine assembly to the tail cone and utilizing the high velocity gases generated for driving the turbine. A group of engine units mounted in a circle with their exhaust gases impinging on a rotary gas turbine would develop rotary torque power in a very economical manner.

While a preferred embodiment of the invention has been shown and described herein by way of a practical example, it is obvious that numerous additions, changes and omissions may be made in this embodiment without departing from the spirit and scope of the invention as defined in the appended claims.

I claim:

1. A pulse reaction combustion engine comprising a closed housing, a free-floating piston mounted for reciprocation within said housing, a fuel-air combustion chamber within said housing below said piston, means for feeding fuel vapor and air to said combustion chamber for compression of the fuel-air mixture when the piston moves on its downstroke, means for igniting the compressed fuel-air mixture in the combustion chamber below the piston to drive the piston on its upstroke, a high pressure chamber above the piston to drive the piston on its downstroke, a gas release opening in the housing in communication with the combustion chamber, a pulse release member carried by the piston and slidable in the gas release opening to close off the combustion chamber on the piston downstroke and open the combustion chamber on the piston upstroke, an air transfer passage extending through the length of the piston and connecting the high pressure chamber with the combustion chamber for supplying compressed air to mix with the fuel vapor in the combustion chamber on the piston upstroke, and a closure member rigidly fixed to the housing and extending within the piston, said closure member being positioned to close off the air transfer passage on the piston downstroke.

2. An engine according to claim 1 in which means are operable by the piston for feeding a charge of air to the high pressure chamber on the piston upstroke, the charge of air being sufficiently compressed by the piston on its upstroke to drive the piston on its downstroke, the air fed to the high pressure chamber being transferred to the combustion chamber on the piston upstroke.

3. An engine according to claim 2 in which said air feeding means includes an air inlet opening in the housing, a low pressure chamber above the piston separated from said high pressure area, valve means connecting said air inlet opening to said low pressure chamber and actuated by movement of said piston to supply external air to said low pressure chamber, and valve means connecting the low pressure chamber to the high pressure chamber for transferring compressed air from the low pressure chamber to the high pressure chamber on the piston upstroke when said air transfer passage is opened.

4. A pulse reaction combustion engine comprising a closed chamber containing a single free-floating piston mounted for reciprocation in a two-stroke cycle, said chamber having a combustion chamber beneath said piston, a high pressure air chamber and a low pressure air chamber above said piston with both the high pressure chamber and low pressure chamber in communication with the upper surface of the piston, first valve means connecting said high pressure and low pressure chambers, an air-inlet chamber in said housing adjacent said piston, second valve means connecting said air inlet chamber and low pressure chamber for admitting air to the latter on the piston downstroke, said first valve means being operable to permit air to pass from the low pressure chamber to the high pressure chamber on the piston upstroke, a nozzle communicating with the combustion chamber for releasing burning gases in a high velocity pulse from the combustion chamber, and a pulse release member carried at the lower end of said piston and closing off the nozzle on the piston downstroke.

5. A pulse reaction combustion engine comprising a closed housing, a single free-floating piston mounted for reciprocation in said housing, a combustion chamber in said housing beneath said piston, a high pressure chamber and a low pressure chamber in said housing above said piston and each communicating with the top surface of said piston, said piston being operable to compress the air in the combustion chamber on the piston downstroke, and to compress the air in the high pressure and low pressure chambers on the piston upstroke, an air inlet opening in the housing, first valve means for admitting a charge of air from the air inlet opening to the low pressure chamber, second valve means for transferring the charge of air from the low pressure area to the high pressure area on the piston upstroke, the charge of air transferred to the high pressure chamber being sufficient to drive the piston on its downstroke, means for feeding fuel to the combustion chamber, third valve means for transferring air from the high pressure chamber to the combustion chamber on the piston upstroke, whereby said transferred air mixes with the fuel fed to the combustion chamber, means for igniting the fuel in the combustion chamber at the bottom of the piston downstroke, whereby the ignited fuel gases drive the piston on its upstroke, and a pulse release member carried by the piston for releasing the ignited fuel gases from the housing as the piston travels on its upstroke.

6. An engine according to claim 5 in which the fuel feeding means includes a liquid fuel passage in a portion of said housing and a fuel conversion chamber in said piston communicating with the mouth of said fuel passage, and with the combustion chamber, the volume of said fuel conversion chamber being increased on the piston downstroke to draw liquid fuel from the passage into the fuel conversion chamber and being reduced on the piston upstroke to force fuel vapor into the combustion chamber.

7. A pulse reaction combustion engine comprising a closed housing, a free-floating piston mounted in said housing for reciprocating in a two-stroke cycle, a combustion chamber in said housing beneath said piston, a hollow cylinder depending from the upper end of said housing and fixed thereto, said piston having an annular opening in its top surface slidably receiving the wall of said cylinder, said cylinder wall having a liquid fuel inlet bore therein, the annular piston opening presenting a fuel conversion chamber between the bottom of said cylinder wall and the bottom of said annular opening, said piston having a fuel vapor passage connecting said fuel conversion chamber with the combustion chamber, said piston increasing the height of said fuel conversion chamber on the piston downstroke for drawing liquid fuel into the conversion chamber, wherein said fuel is vaporized, said piston decreasing the length of said fuel conversion chamber on the piston upstroke for forcing fuel vapor into the combustion chamber.

8. An engine according to claim 7 in which a one-way valve is associated with the liquid fuel inlet bore said valve being operable to open upon reduced pressure in the fuel conversion chamber when the latter is lengthened on the piston downstroke.

9. A pulse reaction combustion engine comprising a closed housing having a top wall and a bottom wall, a free-floating piston mounted for vertical reciprocation within said housing, a combustion chamber between the housing bottom wall and the bottom surface of the piston, a pulse outlet opening in the housing bottom wall in communication with the combustion chamber, a pulse release member carried by the piston at the bottom thereof and slideable in said pulse outlet opening for closing off the combustion chamber on the piston downstroke and opening the combustion chamber on the piston upstroke, a partition plate fixed within the housing parallel to and spaced below said top wall, said partition plate having a central opening bordered by a depending hollow cylinder, the piston having an annular opening in its top surface slidably receiving the wall of said cylinder, the interior of said cylinder above said piston constituting a high pressure chamber, means for feeding a fuel-air mixture into the combustion chamber on the piston upstroke, means for igniting the fuel-air mixture at the bottom of the piston downstroke whereby the burning fuel mixture drives the piston on its upstroke and releases a pulse of burning gases from the pulse outlet opening, valve means operable by the piston movement for feeding air to the high pressure chamber, the piston on its upstroke compressing the air in the high pressure chamber for returning the piston on its downstroke.

10. An engine according to claim 9 in which the housing contains an air inlet opening and a low pressure chamber located above the piston outside the cylininder, said partition plate having at least one opening connecting with the low pressure chamber and the high pressure chamber, a valve normally closing off said partition plate opening and opening said partition plate opening when the pressure in the low pressure chamber exceeds the pressure in the high pressure chamber, and means operable by the piston for reducing the pressure in the high pressure chamber when the piston approaches the top of its upstroke.

11. An engine according to claim 10 in which the pressure reducing means comprises a longitudinal through bore in said piston communicating with the high pressure chamber, a post mounted on the housing top wall and depending therefrom through said piston bore, an air transfer port connecting said through bore with the combustion chamber, said post having an enlarged terminal extension slidable in said through bore and closing off said air transfer port when the piston is in its lower position at the bottom of he downstroke and beginning of the upstroke, and opening up said air transfer port when the piston is in its upper position at the top of its upstroke and beginning of its downstroke.

12. An engine according to claim 11 in which the space between the bottom of the cylinder wall and the bottom of the annular piston opening constitutes a fuel conversion chamber, said cylinder wall having a liquid fuel inlet passage communicating with said fuel conversion chamber, said piston having a fuel vapor passage connecting said fuel conversion chamber with the air transfer port.

13. A pulse reaction combustion engine comprising a closed housing having a cylindrical lower section and a cylindrical upper section of greater diameter than the lower section, a stepped free-floating piston reciprocable in said housing, said piston having a lower cylindrical portion slidable in the housing lower section and a top circular extension of greater diameter located in the housing upper section, the upper end of said housing having a cylinder depending therefrom, the piston having an annular opening in its top end slidably receiving the wall of said cylinder, the interior of said cylinder above the piston constituting a high pressure chamber, the housing forming a low pressure chamber above said piston exteriorly of said cylinder, a very low pressure chamber beneath said cylinder circular extension, and a combustion chamber beneath the piston lower portion, said housing having an air inlet opening communicating with the very low pressure chamber, first valve means operable by said piston and connecting said very low pressure chamber with the low pressure chamber, second valve means operable by air pressure differential and connecting the low pressure chamber with the high pressure chamber, and third valve means operable by said piston and connecting the high pressure chamber with the combustion chamber, said first valve means being operable to transfer a charge of air from the very low pressure chamber to the low pressure chamber on the piston downstroke, said second valve means being operable to transfer the charge of air from the low pressure chamber to the high pressure chamber on the next piston upstroke, said third valve means being operable to release some of the air from the high pressure chamber into the combustion chamber on the next succeeding upstroke.

14. An engine according to claim 13 in which the first valve means comprises a floating ring valve extending around the periphery of the piston top circular extension and slidably engaging the wall of the housing upper section.

15. An engine according to claim 13 in which the housing has an inner partition plate forming a high pressure area above the high pressure chamber and low pressure chamber the partition plate having openings connecting the high pressure chamber and low pressure chamber with the high pressure area, the second valve means comprising a ring valve seated on the partition plate opening connected with the low pressure chamber and the high pressure area, and closing off said opening when the pressure in the high pressure area is greater than the pressure in the low pressure chamber, the third valve means being operable to reduce the pressure in the high pressure chamber and high pressure area below that of the low pressure chamber as the piston approaches the top of its upstroke.

16. An engine according to claim 15 in which the third valve means includes a member fixed to said housing and a passage in the piston connecting the high pressure chamber with the combustion chamber, the fixed member being located to block off the piston passage on the piston downstroke and to unblock the piston passage on the piston upstroke.

References Cited in the file of this patent

UNITED STATES PATENTS

| | | |
|---|---|---|
| 1,035,454 | Lewis | Aug. 13, 1912 |
| 2,292,288 | Pescara | Aug. 4, 1942 |
| 2,396,185 | Mannerstedt et al. | Mar. 5, 1946 |

FOREIGN PATENTS

| | | |
|---|---|---|
| 860,754 | Germany | Dec. 22, 1952 |